(12) United States Patent
Li

(10) Patent No.: US 9,079,581 B1
(45) Date of Patent: Jul. 14, 2015

(54) HYBRID VEHICLE AND METHOD OF OPERATION

(71) Applicant: FORD GLOBAL TECHNOLOGIES, LLC, Dearborn, MI (US)

(72) Inventor: Yonghua Li, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/156,516

(22) Filed: Jan. 16, 2014

(51) Int. Cl.
*B60L 9/00* (2006.01)
*B60W 20/00* (2006.01)
*B60W 10/06* (2006.01)
*B60W 10/08* (2006.01)
*B60W 10/26* (2006.01)
*B60K 1/04* (2006.01)
*B60L 11/18* (2006.01)

(52) U.S. Cl.
CPC ............. *B60W 20/106* (2013.01); *B60W 10/06* (2013.01); *B60W 10/08* (2013.01); *B60W 10/26* (2013.01); *B60K 1/04* (2013.01); *B60L 11/185* (2013.01); *Y02T 10/705* (2013.01); *Y02T 10/7005* (2013.01); *Y10S 903/93* (2013.01)

(58) Field of Classification Search
CPC ............ Y02T 10/7005; Y02T 10/7072; Y02T 10/705; B60K 1/04; B60K 2001/0455; B60L 11/1822; B60L 11/185; B60L 11/1866

USPC ............ 701/22; 320/104, 109, 125, 133, 134; 324/427; 180/65.21, 65.25, 65.1
See application file for complete search history.

(56) References Cited

U.S. PATENT DOCUMENTS

| 6,868,318 | B1 | 3/2005 | Cawthorne et al. | |
|---|---|---|---|---|
| 7,193,392 | B2* | 3/2007 | King et al. | 320/118 |
| 7,245,108 | B2* | 7/2007 | Chertok et al. | 320/132 |
| 7,378,818 | B2* | 5/2008 | Fowler et al. | 320/119 |
| 7,971,669 | B2 | 7/2011 | Gieray et al. | |
| 8,796,987 | B2* | 8/2014 | Scheucher | 320/104 |
| 2003/0006735 | A1* | 1/2003 | Kawakami et al. | 320/133 |
| 2011/0221384 | A1* | 9/2011 | Scheucher | 320/101 |
| 2013/0024063 | A1 | 1/2013 | Yamamoto et al. | |

* cited by examiner

*Primary Examiner* — Gertrude Arthur Jeanglaud
(74) *Attorney, Agent, or Firm* — David B. Kelley; Brooks Kushman P.C.

(57) ABSTRACT

Some vehicle maneuvers in a hybrid electric vehicle require a high discharge current from the battery. The capacity of a battery to supply a large discharge current depends on, among other things, the recent charge and discharge history. When the demand can be predicted in advance, the vehicle is operated to aggressively charge the battery during a time period close in time to the predicted event. As a result of this aggressive charging, the battery delivers more current to satisfy the power demand without allowing the terminal voltage to decrease below a minimum level than the battery would be capable of delivering at the same state of charge following a period of rest.

16 Claims, 6 Drawing Sheets

HYBRID VEHICLE AND METHOD OF OPERATION

TECHNICAL FIELD

This disclosure relates to the field of hybrid electric vehicles. More particularly, the disclosure pertains to a method of operating a hybrid electric vehicle to improve the capability of a battery to satisfy short term power demands.

BACKGROUND

Hybrid electric vehicles improve fuel economy by storing energy in a battery during some driving conditions and utilizing that energy to supplement the power of an internal combustion engine in other driving conditions. Furthermore, hybrid electric vehicles can use a smaller internal combustion engine than a comparably sized conventional vehicle because battery power can supplement the power from the internal combustion engine to satisfy short term power requirements such as when accelerating to enter a freeway. Using a smaller engine improves fuel economy because internal combustion engines are typically more efficient when operated at a higher percentage of their maximum power capability.

However, the battery voltage decreases when power is withdrawn. In order to ensure battery with designed operational life, vehicle control strategies typically limit the maximum power withdrawn from the battery to ensure that the battery voltage stays above a predetermined minimum voltage. This maximum battery power limits vehicle performance with a particular engine and limits the opportunity to use a smaller engine.

SUMMARY OF THE DISCLOSURE

A method of operating a hybrid electric vehicle utilizes a prediction of future power demands to aggressively charge the battery in anticipation of high power demand events such as accelerating on a highway entrance ramp. The prediction may be generated by a GPS system using a database of road segments associated with speed limits or average speeds. The method may wait until close to the time of the event to perform the aggressive charging. The appropriate time to initiate the aggressive charging may be determined by the battery time constant. The method may adapt to changes in state of charge, temperature, and battery age which influence the battery time constant. By charging aggressively just before the event, the battery may deliver a greater current or deliver it for a longer duration while the battery voltage stays above the minimum voltage.

A hybrid electric vehicle includes a battery having a time constant, at least one motor configured to draw current from the battery, an internal combustion engine, and a controller. The motor and the engine are both configured to deliver torque to vehicle wheels. The controller is programmed to respond to a prediction of a future torque demand event by waiting until within two time constants of the event and then operating the vehicle to supply a charging current to the battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
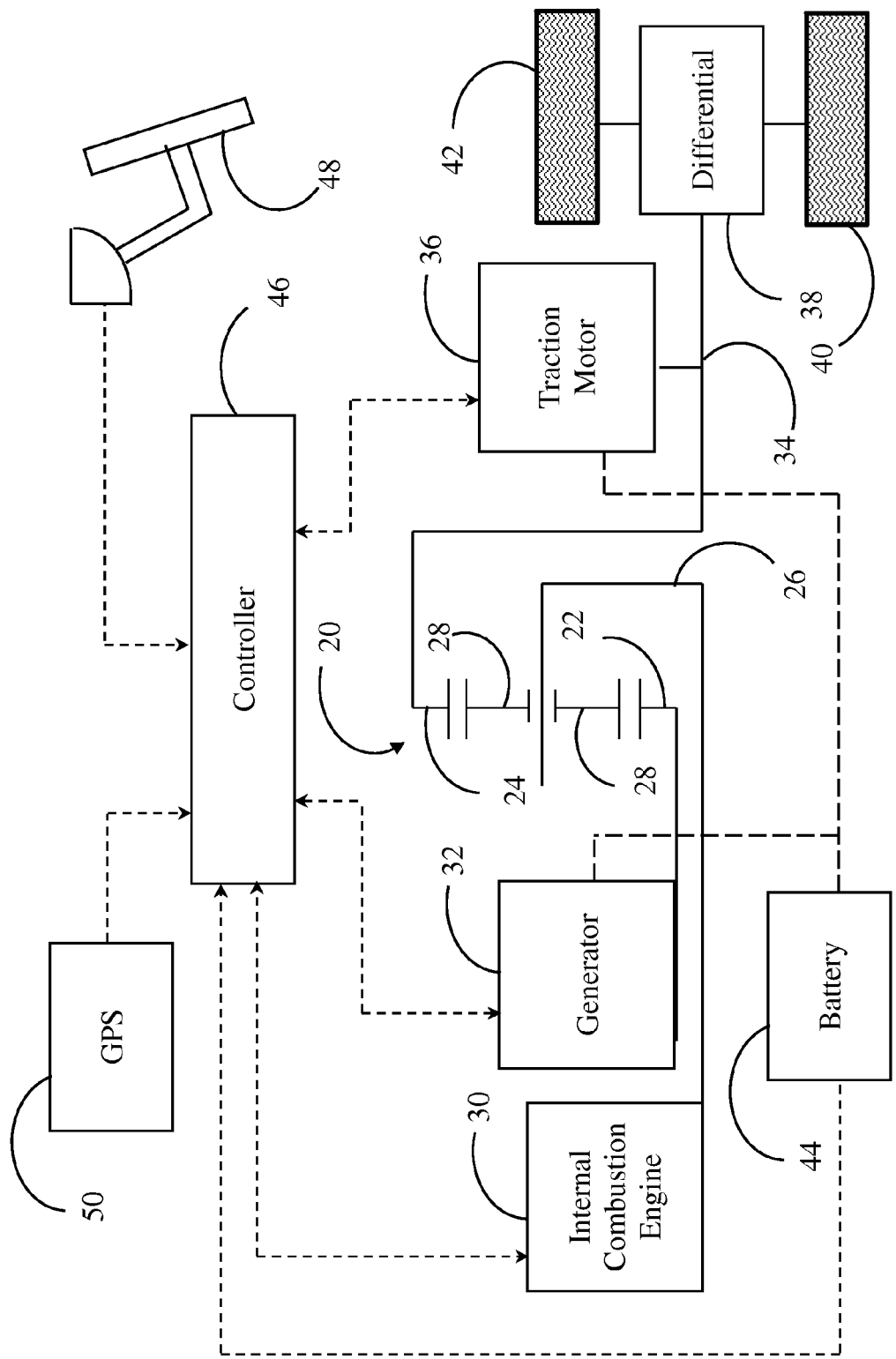
FIG. 1 is a schematic representation of a hybrid vehicle powertrain.

FIG. 1 is a schematic representation of a power-split type hybrid vehicle. Solid lines represent mechanical connections among components. Lines with long dashes represent electrical power connections among components. Lines with short dashes represent signal connections. This configuration is called a power-split because planetary gear set 20 splits the power flowing from the engine to the wheels into a mechanical power flow path and an electrical power flow path. Planetary gear set 20 includes sun gear 22, ring gear 24, and carrier 26 which are rotate about a common axis. A number of planet gears 28 are supported for rotation with respect to carrier 26 and mesh with both sun gear 22 and ring gear 24.

Internal combustion engine 30 is drivably connected to carrier 26. Sun gear 22 is drivably connected to generator 32. Ring gear 24 is drivably connected to output shaft 34. A driveable connection is established between two components if rotation of one component causes the other component to rotate at a proportional speed. In FIG. 1, these connections are shown as direct connections, but the connections may include gearing. Output shaft 34 is also drivably connected to traction motor 36 and differential 38. Differential 38 transmits power to a left wheel 40 and a right wheel 42 while permitting slight variations in speed, such as when the vehicle turns a corner.

Generator 32 and traction motor 36 are both reversible electrical machines capable of converting electrical energy into rotational mechanical energy and converting rotational mechanical energy into electrical energy. For example, generator 32 and traction motor 36 may each be DC motors or AC motors, such as synchronous motors or induction motors, in combination with inverters. Generator 32 and traction motor 36 are both electrically connected to battery 44. Battery 44 converts electrical energy into chemical energy for storage and converts the chemical energy back into electrical energy.

The level of torque produced by the internal combustion engine, generator, and traction motor, respectively, are controlled by commands from controller 46. The controller determines the desired torque levels based on sensors associated with accelerator pedal 48, engine 30, generator 32, traction motor 36, and battery 44. Additionally, the controller may receive information, such as current location and anticipated future driver demands, from global positioning system 50. Controller 46 may be implemented as a single microprocessor, as multiple communicating microprocessors, or other means. Controller 46 may be programmed by means of software, hardware, or some combination thereof.

Figure 2:
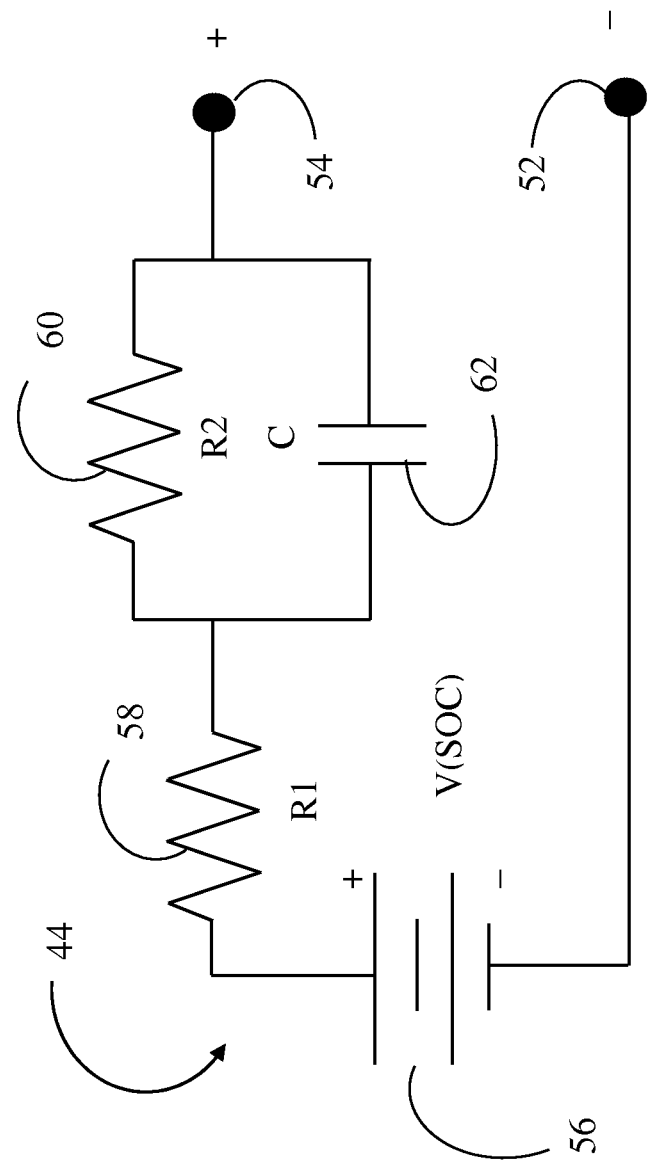
FIG. 2 is a schematic of a circuit used to model the dynamic behavior of a battery.

FIG. 2 shows a Randles circuit model that may be used to model the dynamic behavior of a battery such as battery 44. The battery has negative terminal 52 and positive terminal 54. The battery provides electrical power by forcing electrical current to flow out the positive terminal, through a load such as an electric motor, and back into the negative terminal. To charge the battery, electrical current is forced by a power source, such as a generator, to flow into the positive terminal and out the negative terminal. Voltage source 56 represents the voltage resulting from the state of the chemicals. This voltage can vary slightly depending upon state of charge of the battery and the battery temperature. To improve battery life, the state of charge may is maintained between a minimum state of charge and a maximum state of charge. Resistors 58 and 60 represent the ohmic and charge transfer resistances of the battery. Due to these resistances, the net electrical power that can be withdrawn from the battery is less than the net electrical power used to charge the battery. These resistances typically vary with temperature and state of charge. Finally, capacitor 62 represents the fact that the conversion between electrical energy and chemical energy may not proceed at the same rate that electrical energy is provided or withdrawn by the attached circuit. A battery tends to lose its power capability (power fade) and capacity (capacity fade) as it is used over time. Both phenomena are attributed to battery aging. As battery ages, its dynamics change as well, which is represented by changes in its model parameters, such as R1, R2, and C, at the same temperature and state of charge. There are known techniques for a controller to adaptively adjust these parameters during use.

Figure 3:
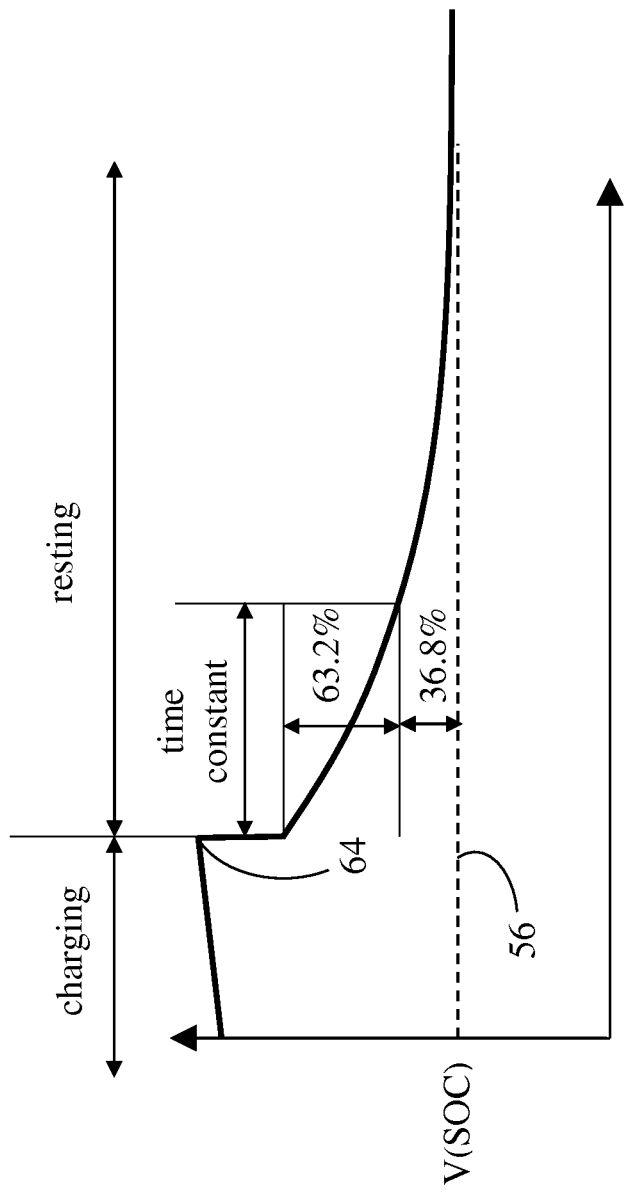
FIG. 3 is a graph illustrating the dynamic behavior of a battery following a charging event.

The dynamic behavior of a typical battery following a charge event is illustrated in FIG. 3. The thick line represents the voltage between the positive and negative terminals. Prior to point 64, a charging current is supplied, causing the positive voltage across each resistor 58 (R1) and 60 (R2). At point 64, charging is terminated and no current flows into or out of the battery. At point 64, the voltage across resistor 58 (R1) decreases to zero immediately. However, the voltage across resistor 60 (R2) and capacitor 62 (C) begin a gradual decay which asymptotically approaches the resting voltage 56 V(SOC). This decay is characterized by a time constant equal to R2*C. Since a Randles circuit such as that shown in FIG. 2 is merely a way of modeling dynamic behavior of a battery, one cannot directly measure R2 and C. However, the time constant for a given battery can be determined experimentally by measuring the time required for the voltage to decay 63.2% of the way to the resting voltage. The time constant for a given battery can also be adaptively learned during battery operation. For the types of batteries commonly used in hybrid electric vehicles, the time constant is typically around 5-100 seconds.

Figure 4:
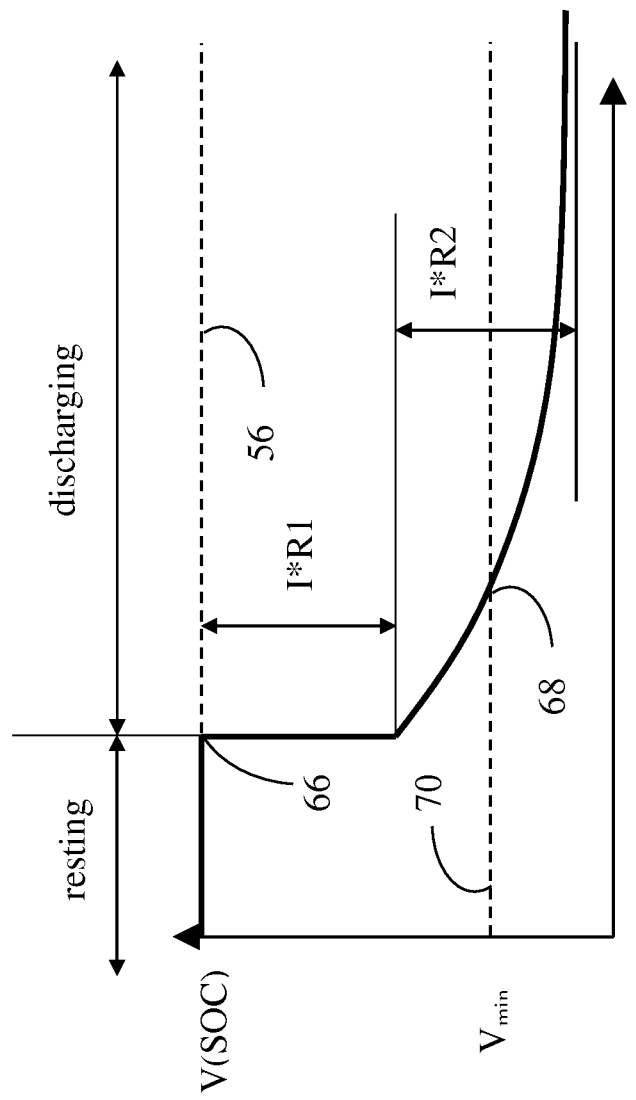
FIG. 4 is a graph illustrating the dynamic behavior of a battery during a discharge event.

The dynamic behavior of a typical battery during a discharge event is illustrated in FIG. 4. If the battery has been in a resting state for a significant time prior to point 66, then the voltage between the terminals is equal to V(SOC). Starting at 66, the vehicle draws a discharging current I. The voltage between the terminals drops immediately due to the resistor 58 (R1). Initially, the current flows through capacitor 62 (C) such that resistor 60 (R2) does not cause a voltage drop. Over time, the current through resistor 60 (R2) increases toward I and the voltage drop across resistor 60 asymptotically approaches I*R2. At point 68, the voltage across the terminals decreases below the minimum voltage 70 ($V_{min}$). The minimum voltage is a calibratable value selected to balance performance, which favors a lower value, and battery life, which favors a higher value.

Figure 5:
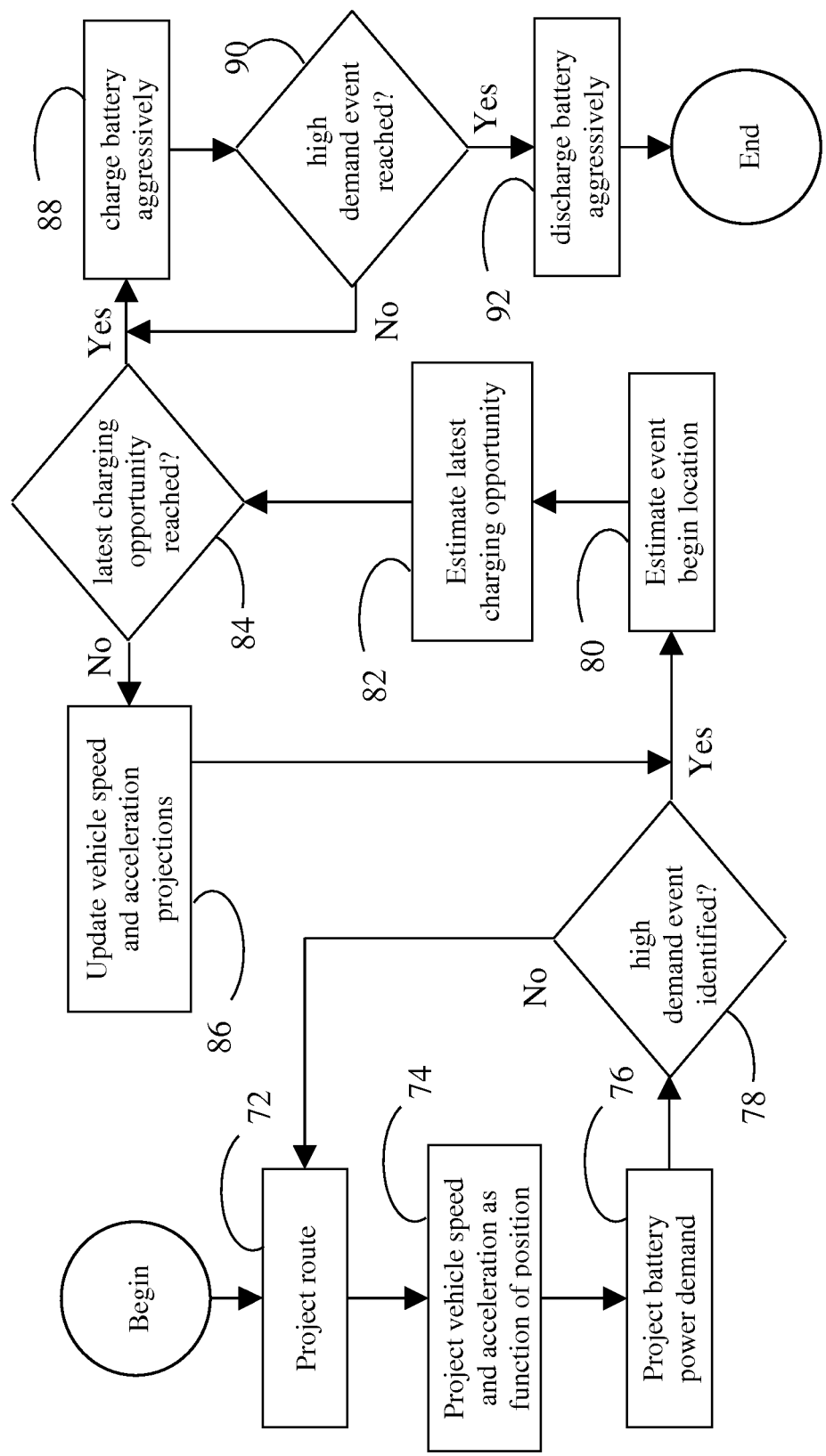
FIG. 5 is a flow chart for a method to operate a hybrid electric vehicle.

FIG. 5 illustrates a method that takes advantage of the transient characteristics of a battery to enable the vehicle to better respond to short term high power demand events. At 72, the vehicle controller projects the next segment of the most likely route for the vehicle. This may involve interfacing with an onboard navigation system that determines the current vehicle location and contains a database of roads. The database may include various information about the roads, such as the speed limit. The driver may enter a destination into the navigation system and request route guidance. Additionally, the vehicle controller may interface with turn signals or may utilize historical information about the driver's habits to project the most likely route. The extent of the upcoming route that should be forecast is related to the battery time constant. It is not necessary to project further than what the vehicle will traverse in about ten time constants. At 74, the controller projects the vehicle speed and acceleration as a function of progress along the projected route. The controller may utilize stored data about typical speeds and accelerations on various road segments. The controller may also utilize other information, such as real time traffic information, if it is available. Based on this information, at 76 the controller projects the demand for battery power along the route. The demand for battery power is positive whenever the vehicle power demand exceeds the power that will be available from the engine and is negative when the engine is capable of producing more power than the vehicle requires.

At 78, the controller attempts to identify a high power demand event based on the battery power projection. A high power demand event is an event that would cause the battery voltage to drop below Vmin if the event is initiated with the battery voltage at V(SOC) as illustrated at 68 in FIG. 4. High power demand events typically occur when the expected speed on one road segment is significantly higher than the expected speed on the previous road segment. For example, freeway entrance ramps are known to be associated with rapid acceleration to highway speed. If no such event is identified, the controller returns to 72. If a high power demand event is identified, the controller estimates the event location at 80 and estimates the latest charging opportunity at 82. The latest charging opportunity is the region with projected negative battery power demand that is closest to the event location. At 84, the controller checks whether the vehicle has reached the beginning of the latest charging opportunity. If not, then it refines the estimated speed and acceleration projections at 86 and returns to 82. In this circumstance, waiting to start charging the battery is advantageous. Once the vehicle has entered the region identified as the latest charging opportunity, the controller commands the vehicle to aggressively charge the battery at 88. Once the event is reached, as determined at 90, the controller commands the vehicle to aggressively discharge the battery.

Figure 6:
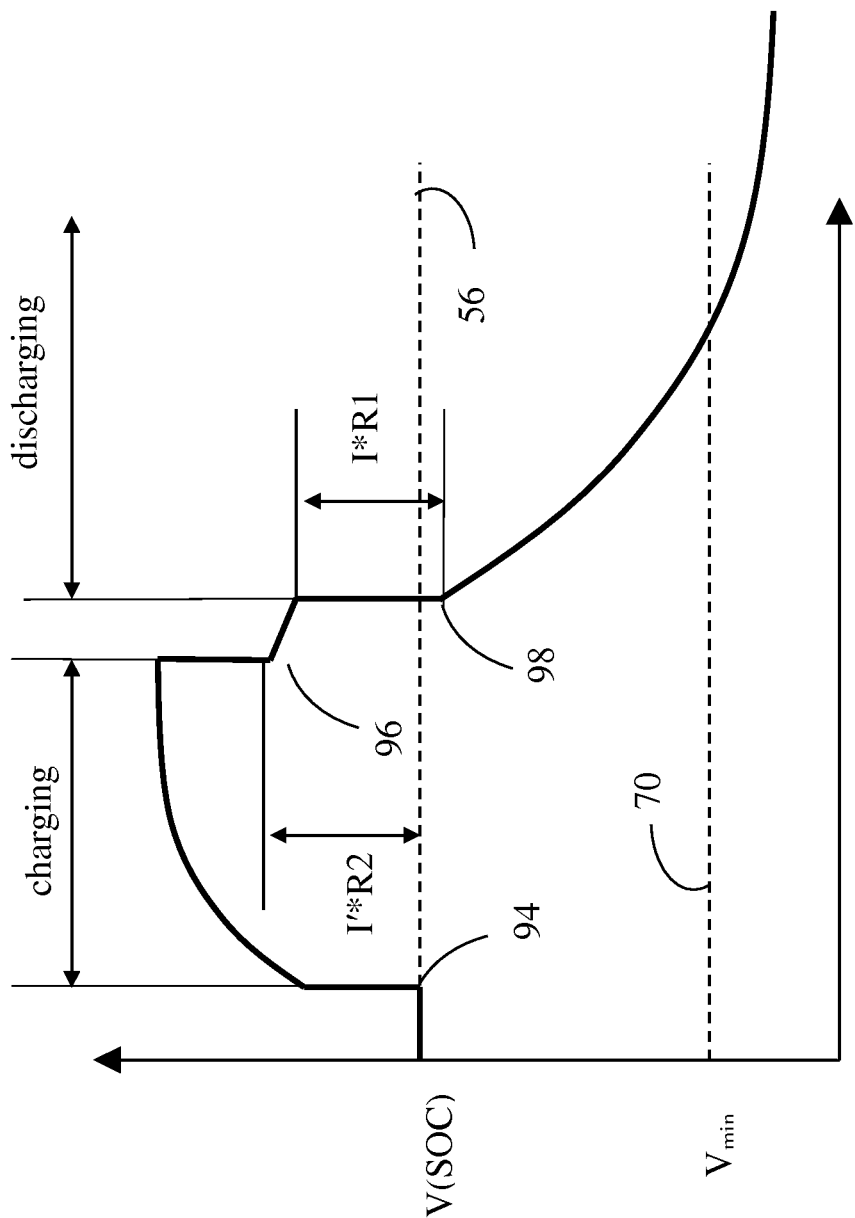
FIG. 6 is a graph illustrating the dynamic behavior of a battery in a vehicle following the method of FIG. 5.

FIG. 6 shows the battery voltage when the method of FIG. 5 is used. The battery is initially at V(SOC). Between 94 and 96, the battery is charged with a charging current of I'. Consequently, the battery voltage is V(SOC)+I'*R2 when the charging is terminated at 96. It may be impractical to increase the voltage this much by increasing the state of charge because V(SOC) only increases slightly with state of charge. Even at the maximum state of charge, V(SOC) is only modestly increased relative to V(SOC) at the minimum state of charge. This voltage begins to decline as soon as charging is terminated, so it is beneficial to delay the charging phase until very close to the beginning of the power demand event. The power demand event begins at 98. As in FIG. 4, the voltage would eventually decrease to the minimum voltage. However, due to the higher voltage at the beginning of the high power demand event, it takes longer for the battery voltage to reach $V_{min}$ for a given discharge current. Alternatively, a larger discharge current may be drawn for the same time interval as FIG. 4.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery having a time constant;
   a motor configured to draw current from the battery and to deliver torque to vehicle wheels;
   an internal combustion engine configured to deliver torque to the vehicle wheels; and
   a controller configured to respond to a prediction of a future power demand event by waiting until within two time constants of the event and then operating the vehicle to supply a charging current to the battery.

2. The vehicle of claim 1 wherein:
   the battery has a voltage which declines to a minimum voltage after the battery supplies a first current for a duration following a period of rest at a state of charge; and
   the controller is further configured to respond to occurrence of the power demand event by drawing a second current greater on average than the first current for the duration at a battery voltage not less than the minimum voltage.

3. The vehicle of claim 1 further comprising a navigation system configured to predict future power demand based on a current vehicle location and a database containing speed limit data for nearby road segments.

4. The vehicle of claim 3 wherein the nearby road segment is a freeway entrance ramp.

5. The vehicle of claim 3 wherein the navigation system predicts power demand based on current traffic speed data.

6. The vehicle of claim 1 further comprising a second motor.

7. The vehicle of claim 6 further comprising a planetary gear set having a carrier drivably connected to the engine, a sun gear drivably connected to the second motor, and a ring gear drivably connected to the vehicle wheels.

8. A method of operating a hybrid electric vehicle having a battery, the battery having a time constant, the method comprising:
   in anticipation of a predicted high power demand event, waiting until within two time constants of the event and then operating the vehicle to supply a charging current to the battery; and
   in response to occurrence of the event, operating the vehicle to draw a discharge current from the battery for a duration.

9. The method of claim 8 wherein:
   the battery has a state of charge at a beginning of the duration;
   the battery has a terminal voltage which exceeds a minimum voltage throughout the duration; and
   the terminal voltage declines below the minimum voltage if the discharge current is drawn for the duration following a period of rest at the state of charge.

10. The method of claim 8 wherein a magnitude and duration of the charging current is based on a battery temperature.

11. The method of claim 8 wherein a magnitude and duration of the charging current is based on a battery age.

12. A method of operating a hybrid electric vehicle having a battery, the method comprising:
    in anticipation of a predicted power demand event, operating the vehicle to charge the battery to a state of charge that does not exceed a maximum state of charge; and
    in response to occurrence of the event, drawing a discharge current for a duration such that a battery terminal voltage does not fall below a minimum voltage, wherein drawing the discharge current from the battery for the duration starting from a state of rest at the maximum state of charge when not operating the vehicle results in the battery terminal voltage declining below the minimum voltage.

13. The method of claim 12 wherein the battery has a time constant and the method further comprises:
    after the event is predicted, waiting to operate the vehicle to charge the battery until within two time constants of the time of the event.

14. The method of claim 13 further comprising predicting the power demand event based on a current vehicle location and a database containing speed limit data for nearby road segments.

15. The method of claim 14 wherein the nearby road segments include a freeway entrance ramp.

16. The method of claim 14 further comprising predicting the power demand event based on current traffic speed data.

* * * * *